Patented May 1, 1951

2,551,566

UNITED STATES PATENT OFFICE 2,551,566

PRODUCTION OF ALPHA-AMINO, ALPHA-CYANO GLUTARIC ACID COMPOUNDS AND CERTAIN ALKYL DERIVATIVES

Owen A. Moe and Donald T. Warner, Minneapolis, Minn., assignors to General Mills, Inc., a corporation of Delaware No Drawing. Application July 3, 1948,
Serial No. 37,066

6 Claims. (Cl. 260—465.4)

The present invention relates to novel intermediates for the synthesis of amino acids and also to the synthesis of dl-glutamic acid.

The intermediates of the present invention have the following structural formula:

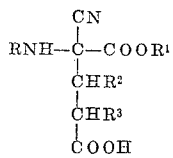

in which R is an acyl group such as acetyl, benzoyl, etc., $R^1$ is a low aliphatic group containing from 1 to 4 carbon atoms, such as methyl, ethyl, propyl, and the like, and $R^2$ and $R^3$ may be either hydrogen or methyl.

The following equation illustrates the manner in which a typical intermediate of the present invention may be prepared and also the manner in which the intermediate may be used in the synthesis of glutamic acid:

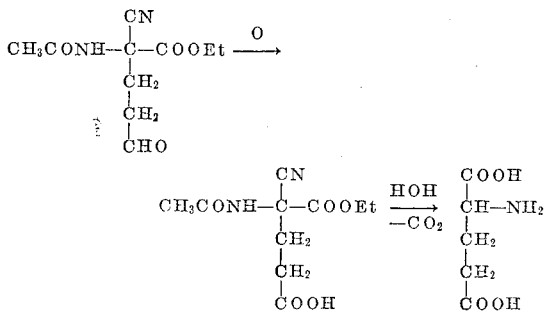

The aldehyde starting materials of the present invention may be prepared by the general method disclosed in our copending applications entitled Aldehydes, Serial No. 714,645, filed December 6, 1946, now abandoned, and Aldehydo Compounds and Processes of Producing the Same, Serial No. 648,020, filed February 15, 1946, now abandoned. In preparing the aldehyde starting materials of the present invention the process involves the 1,4 addition of N acyl substituted cyanoacetates such as acetamido cyanoacetate to unsaturated aldehydes such as acrolein. In general, this reaction is preferably carried out in the following manner. The ethyl acetamido cyanoacetate is dissolved in an organic solvent diluent, an alkaline catalyst is added, and thereafter the acrolein is added gradually over an extended period of time, the temperature is maintained reasonably low, as for example in the approximate range of 0–50° C. After the reaction is complete, the catalyst may be neutralized and the solution concentrated in vacuum to recover the desired aldehyde. This reaction may be carried out with various ester groups on the acetamido cyanoacetate molecules. Likewise, the reaction may be carried out with various substituted amino groups on the cyanoacetic ester. Similarly the reaction proceeds in essentially the same manner by using either methacrolein or crotonaldehyde in place of acrolein. In this manner, it is possible to produce the various aldehydes contemplated as starting material for the present invention.

The oxidation of the aldehyde to the acid in accordance with the equation given above may be carried out by means of any suitable oxidizing agent. It has been found, however, that the reaction proceeds very readily by means of an alkali metal permanganate. For this purpose, the aldehyde starting material is dissolved in water and the solution maintained at a relatively low temperature, for example by means of water or an ice cooling bath. The temperature should not be permitted to exceed 50° C. and it is desirable to have it maintained between 0° C. and 25° C. Similarly, it is desirable to maintain the pH on the alkaline side, preferably within a definite pH range of about 8 to 10. The reaction mixture is then permitted to stand for an extended period of time and the precipitated manganese dioxide is removed by filtration. The reaction mixture is then acidified and filtered. The filtrate is concentrated in vacuo. The concentrate is then treated with sodium chloride to form a saturated solution, and the salted solution extracted with an organic solvent from which the acid is crystallized and recovered. The intermediate carboxylic acid thus obtained is a crystalline compound melting at 155-7° C. Nitrogen analysis and neutral equivalent determination indicate the product has the desired structure.

The hydrolysis and decarboxylation of the resulting intermediate carboxylic acid may be accomplished readily by refluxing with concentrated hydrochloric acid. For this purpose, a mixture of the intermediate acid and concentrated hydrochloric acid may be refluxed for an extended period of time, for example, overnight. Thereafter the reaction mixture may be concentrated in vacuo to dryness. The residual solid is then dissolved in water, filtered, and the filtrate neutralized to a pH of about 3.2. Cooling of the resulting water solution results in the crystallization of glutamic acid which may be collected by filtration. The crystalline product thus obtained melts at approximately 193–4° C. with decomposition, and when mixed with an authentic sample of dl-glutamic acid shows no depression in the melting point. The N-benzoyl derivative of the glutamic acid of the present invention melts at 156–157.5° C.

EXAMPLE 1

*Preparation of gamma-acetamido-gamma-carbethoxy-gamma-cyanobutyraldehyde*

Fifty-one grams (51 g.) of ethyl acetamido cyanoacetate were added to an alcoholic solution containing 100 cc. of absolute ethanol and 50 mg. of sodium. The resulting suspension was cooled to 20° C. in a water bath. The reaction mixture was alkaline to litmus. Twenty and four-tenths cc. (20.4 cc.) of acrolein dissolved in 10 cc. of absolute ethanol were added dropwise with stirring over a twenty-five minute period. The temperature increased to 50° C. and was maintained at this temperature during the addition of the alpha,beta-unsaturated aldehyde. When the addition of the aldehydo compound was complete, the warm reaction solution was filtered. The filtrate was permitted to stand at room temperature overnight when a copious amount of a silvery precipitate had formed. The reaction product was collected by filtration and washed with two portions of cold absolute ethanol and one portion (15 cc.) of ether. After drying in vacuo the gamma-acetamido-gamma-carbethoxy-gamma-cyanobutyraldehyde weighed 40.3 g. and melted at 109–112° C. This represents approximately 60% yield from the first crop. The filtrate yielded an additional quantity of the desired substituted butyraldehyde.

EXAMPLE 2

*Permanganate oxidation of the crystalline gamma-acetamido-gamma-carbethoxy-gamma-cyanobutyraldehyde*

A portion (2.24 g.) of the gamma-acetamido-gamma-carbethoxy-gamma-cyanobutyraldehyde was dissolved in 40 cc. of water. The resulting solution was cooled in an ice bath to 15° C. and a solution of potassium permangate containing 1.1 g. of potassium permangate in 40 cc. of water was added in portions. When approximately one-half of the permanganate solution had been added, a solution of potassium hydroxide containing 0.4 g. of potassium hydroxide in 3 cc. of water was added. The remainder of the potassium permanganate was added. The resulting reaction mixture was permitted to stand overnight and then the precipitated manganese dioxide was removed by filtration. The filtrate was water-white and possessed a pH of 7. The reaction mixture was acidified with 1.5 cc. of concentrated hydrochloric acid, and after filtration the filtrate was concentrated in vacuo to a volume of approximately 20 cc. The reaction mixture was then saturated with sodium chloride and the formation of an oil was noted. The water layer was extracted with three 60 cc. portions of chloroform. The chloroform extracts were combined and dried over anhydrous sodium sulfate. At the surface of the chloroform solution crystals in the form of long needles had formed. This crystalline product was collected by decantation and dried in vacuo. The crystalline product thus obtained melted at 155–157° C. An analytical sample of this crystalline gamma-acetamido-gamma-carbethoxy-gamma-cyanobutyric acid was prepared (M. P.=154–154.5° C.).

Anal.—Calcd. for $C_{10}H_{14}O_5N_2$:N, 11.66. Found: N, 11.55.

The neutral equivalent of this intermediate acid was also determined.

Calcd.: 240.2. Found: 241.7.

EXAMPLE 3

*Permanganate oxidation of the crystalline gamma-acetamido-gamma-carbethoxy-gamma-cyanobutyraldehyde*

Twenty-two and six-tenths grams (22.6 g.) of gamma-acetamido-gamma-carbethoxy-gamma-cyanobutyraldehyde were dissolved in 400 cc. of water. The requisite amount of aqueous potassium (11 g. in 400 cc. water) permanganate was added in approximately 50 cc. portions, the temperature was maintained at 8–12° C. and the pH at approximately 8. After the oxidation appeared to be complete, the temperature of the reaction mixture was permitted to increase to room temperature and the mixture was allowed to stand overnight. The precipitated manganese dioxide was removed by filtration, and the water-white filtrate was acidified with 10 cc. of concentrated hydrochloric acid. After acidification the solution was concentrated in vacuo to a volume of approximately 100 cc. when a turbid emulsion resulted. After saturation with sodium chloride the reaction mixture was extracted with two 100 cc. portions of ethyl acetate. After drying over anhydrous sodium sulfate, the ethyl acetate solution was concentrated in vacuo to dryness. The residual solid was macerated with 50 cc. of ether and filtration yielded a white amorphous solid. The solid product thus obtained was heated to boiling with 40 cc. of ethyl acetate, and the hot ethyl acetate reaction mixture was filtered. The amorphous solid was only partially dissolved, and the insoluble material melted at 151–3° C. This was substantially pure gamma-acetamido-gamma-carbethoxy-gamma-cyanobutyric acid. The filtrate upon cooling yielded an additional quantity of the crystalline product. This substituted butyric acid was subjected to hydrolysis and decarboxylation to yield dl-glutamic acid as described below.

EXAMPLE 4

*Hydrolysis of intermediate acid to yield dl-glutamic acid*

Five grams of the gamma-acetamido-gamma-carbethoxy-gamma-cyanobutyric acid (M. P. 151–3° C.) were mixed with 25 cc. of concentrated hydrochloric acid. The resulting reaction mixture was heated to the reflux temperature and the reflux temperature was maintained for a period of 16 hours. The reaction mixture was then concentrated in vacuo to dryness. The residual solid was dissolved in 12 cc. of water and filtered. The reaction mixture was neutralized by the addition of 9.9 cc. of 10% sodium hydroxide to a pH of 3.2. The resulting water solution was cooled and the crystalline product was collected by filtration. After drying in vacuo the dl-glutamic acid thus obtained melted at 193–4° C. with decomposition. When mixed with an authentic sample of dl-glutamic acid there was no depression in the melting point. The dl-glutamic acid was further characterized as the benzoyl derivative and the purified n-benzoyl glutamic acid melted at 156–157.5° C.

This is a continuation-in-part of our copending applications, Serial No. 648,020, filed February 15, 1946, entitled Aldehydo Compounds and Processes of Producing the Same, and Serial No. 714,645, filed December 6, 1946, entitled Aldehydes.

While numerous modifications of the invention have been described, other modifications are also possible without departing from the spirit of the invention.

We claim as our invention:

1. Process of producing intermediates for glutamic acid and substituted glutamic acids which comprises oxidizing by means of a manganese-containing oxidizing agent an aldehyde having the formula

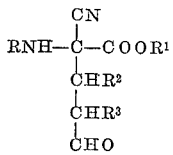

in which R is an acyl group, $R^1$ is a lower aliphatic group, and $R^2$ and $R^3$ are selected from the group consisting of hydrogen and methyl, to produce the corresponding acid.

2. Process of producing intermediates for alpha-methyl-glutamic acid which comprises oxidizing by means of a manganese-containing oxidizing agent an aldehyde having the formula

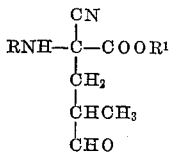

in which R is an acyl group and $R^1$ is a lower aliphatic group, to produce the corresponding acid.

3. Process of producing intermediates for beta-methyl-glutamic acid which comprises oxidizing by means of a manganese-containing oxidizing agent an aldehyde having the formula

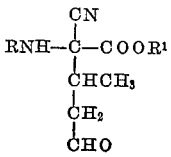

in which R is an acyl group and $R^1$ is a lower aliphatic group, to produce the corresponding acid.

4. Process of producing intermediates for glutamic acid which comprises oxidizing gamma-acetamido-gamma - cyano - gamma-carbethoxybutyraldehyde in aqueous solution by means of an alkali metal permanganate at a temperature not in excess of 50° C. while maintaining a pH within the approximate range of 8–10 to convert said aldehyde to the corresponding acid.

5. Process of producing intermediates for glutamic acid which comprises oxidizing gamma-acetamido-gamma - cyano - gamma-carbethoxybutyraldehyde in aqueous solution by means of an alkali metal permanganate at a temperature not in excess of 50° C. while maintaining a pH within the approximate range of 8–10, to convert said aldehyde to the corresponding acid.

6. Process of producing intermediates for glutamic acid which comprises oxidizing gamma-acetamido-gamma - cyano - gamma-carbethoxybutyraldehyde in aqueous solution by means of an alkali metal permanganate at a temperature not in excess of 25° C. while maintaining a pH within the approximate range of 8–10, to convert said aldehyde to the corresponding acid.

OWEN A. MOE.
DONALD T. WARNER.

REFERENCES CITED

The following references are of record in the file of this patent:

UNITED STATES PATENTS

| Number | Name | Date |
|---|---|---|
| 2,111,509 | Loder | Mar. 15, 1938 |
| 2,449,993 | Gresham et al. | Sept. 28, 1948 |

OTHER REFERENCES

Heilbron: Dict. of Organic Comp'ds (Oxford), p. 274 (1934).

Albertson et al.: J. Am. Chem. Soc., vol. 67, pp. 502, 503 (1945).

Block: Chem. Reviews, vol. 38, p. 545 (1946).

Block: Chem. Reviews, vol. 38, p. 501 (1946).